US009064019B2

(12) United States Patent
Maghoul

(10) Patent No.: US 9,064,019 B2
(45) Date of Patent: Jun. 23, 2015

(54) VIRTUAL BILLBOARD DISPLAY ON A MOBILE DEVICE

(75) Inventor: Farzin Maghoul, Hayward, CA (US)

(73) Assignee: YAHOO! INC., Sunnyvale, CA (US)

( * ) Notice: Subject to any disclaimer, the term of this patent is extended or adjusted under 35 U.S.C. 154(b) by 1060 days.

(21) Appl. No.: 11/951,823

(22) Filed: Dec. 6, 2007

(65) Prior Publication Data

US 2009/0149199 A1 Jun. 11, 2009

(51) Int. Cl.
*H04W 4/02* (2009.01)
*G06F 17/30* (2006.01)
*G06Q 30/02* (2012.01)

(52) U.S. Cl.
CPC ............ *G06F 17/3087* (2013.01); *G06Q 30/02* (2013.01); *G06Q 30/0212* (2013.01); *H04W 4/02* (2013.01)

(58) Field of Classification Search
CPC ....... H04W 4/02; H04W 4/023; H04W 4/025; H04W 4/04; G06Q 30/0256; G06Q 30/0267; G06Q 30/0282; G06Q 30/0224; G06Q 30/0233; H04L 67/22; H04L 67/18
USPC .......... 455/414.1, 456.1–456.3, 456.1–456.6; 707/10, 100, 200, 2, 3, 202
See application file for complete search history.

(56) References Cited

U.S. PATENT DOCUMENTS 6,199,045 B1 3/2001 Giniger et al.
6,377,793 B1 4/2002 Jenkins
6,480,713 B2 11/2002 Jenkins
6,681,107 B2 1/2004 Jenkins et al.
6,985,742 B1 1/2006 Giniger et al.
7,009,556 B2 * 3/2006 Stewart .................... 342/357.13
7,089,264 B1 * 8/2006 Guido et al. ............... 707/104.1
7,116,985 B2 * 10/2006 Wilson et al. .............. 455/456.1
7,577,244 B2 * 8/2009 Taschereau .............. 379/218.01
7,966,321 B2 * 6/2011 Wolosin et al. ............... 707/728
8,655,871 B2 * 2/2014 Ranjan et al. ................ 707/722
2003/0046158 A1 * 3/2003 Kratky ............................ 705/14
2004/0214550 A1 10/2004 Jenkins
2005/0174975 A1 8/2005 Mgrdechian et al.
2005/0228780 A1 * 10/2005 Diab et al. ........................ 707/3
2006/0036493 A1 * 2/2006 Aufricht et al. ................. 705/14
2006/0085419 A1 4/2006 Rosen
2006/0161599 A1 7/2006 Rosen
2006/0253481 A1 * 11/2006 Guido et al. .................. 707/100
2007/0060099 A1 * 3/2007 Ramer et al. .................. 455/405
2007/0083408 A1 * 4/2007 Altberg et al. .................... 705/7
2007/0150353 A1 * 6/2007 Krassner et al. ................ 705/14
2007/0192189 A1 * 8/2007 Popowich et al. .............. 705/14
(Continued)

*Primary Examiner* — Khawar Iqbal
(74) *Attorney, Agent, or Firm* — James J. DeCarlo; Greenberg Traurig, LLP

(57) ABSTRACT

A method, system, and apparatus are directed to providing advertising information to a mobile device over a network. A request is received from the mobile device. The request may comprise a query, geo-location information, and/or a user preference. If the request comprises the query, a search result is generated based on a search for the received query and/or the received geo-location information. At least one virtual billboard is determined, wherein the at least one virtual billboard is in proximity with a first geo-location identified by the received geo-location information and/or a second geo-location associated with the search result. The virtual billboard may also be based on a type of the virtual billboard, a time, a user preference (criterion), and/or a keyword included in the query. The virtual billboard is provided to the mobile device. An advertising usage is recorded for the provided virtual billboard.

18 Claims, 5 Drawing Sheets

START
Determine Purchase Of Right To Use Virtual Billboard For Geo-Location (See Fig. 5) — 402
Receive Request From Mobile Device — 404
406: Request Includes Geo-Location Information But Excludes Query? — YES → 408: Determine Virtual Billboard(s) In Proximity With Received Geo-Location
NO
410: Request Includes Query But Excludes Geo-Location Information? — YES → 412: Determine Virtual Billboard(s) In Proximity With Geo-Location Associated With Search Results
NO
414: Request Includes Query And Geo-Location Information? — NO
YES
Determine Virtual Billboard(s) In Proximity With Received Geo-Location and/or Geo-Location Associated With Search Results — 416
Select Virtual Billboard From Virtual Billboard(s) Based On Other Criteria(s) — 418
Provide (Selected) Virtual Billboard — 420
Record Advertising Usage — 422
RETURN
400

(56) References Cited

U.S. PATENT DOCUMENTS

2008/0065481 A1* 3/2008 Immorlica et al. .............. 705/14
2008/0140479 A1* 6/2008 Mello et al. ....................... 705/7
2008/0172357 A1* 7/2008 Rechis et al. ..................... 707/2
2008/0215494 A1* 9/2008 Corbett ........................... 705/80
2008/0249841 A1* 10/2008 Ruark et al. .................... 705/10
2008/0249853 A1* 10/2008 Dekel et al. ..................... 705/14
2011/0022602 A1* 1/2011 Luo et al. ...................... 707/748
2011/0145059 A1* 6/2011 Baluja ........................ 705/14.48
2011/0264654 A1* 10/2011 Wolosin et al. ............... 707/724
2013/0210462 A1* 8/2013 Busch ........................ 455/456.3
2014/0052581 A1* 2/2014 Bilange ...................... 705/26.62

* cited by examiner

VIRTUAL BILLBOARD DISPLAY ON A MOBILE DEVICE

FIELD OF THE INVENTION

The present invention relates generally to communication on mobile devices, and more specifically, but not exclusively to providing advertising information on mobile devices.

BACKGROUND

Mobile devices have become a major mechanism of communication. Increasingly, advertising information is being provided on mobile devices. Advertising information may include graphics, text, sound, or the like. Advertising information may be provided through a variety of mechanisms on a mobile device.

Global Positioning System (GPS) technology has improved our ability to detect precise geo-locations. GPS integration into mobile devices enables mobile detection of these locations. However, while GPS technology may provide accurate coordinates, it does not always provide other meaningful information about the location. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
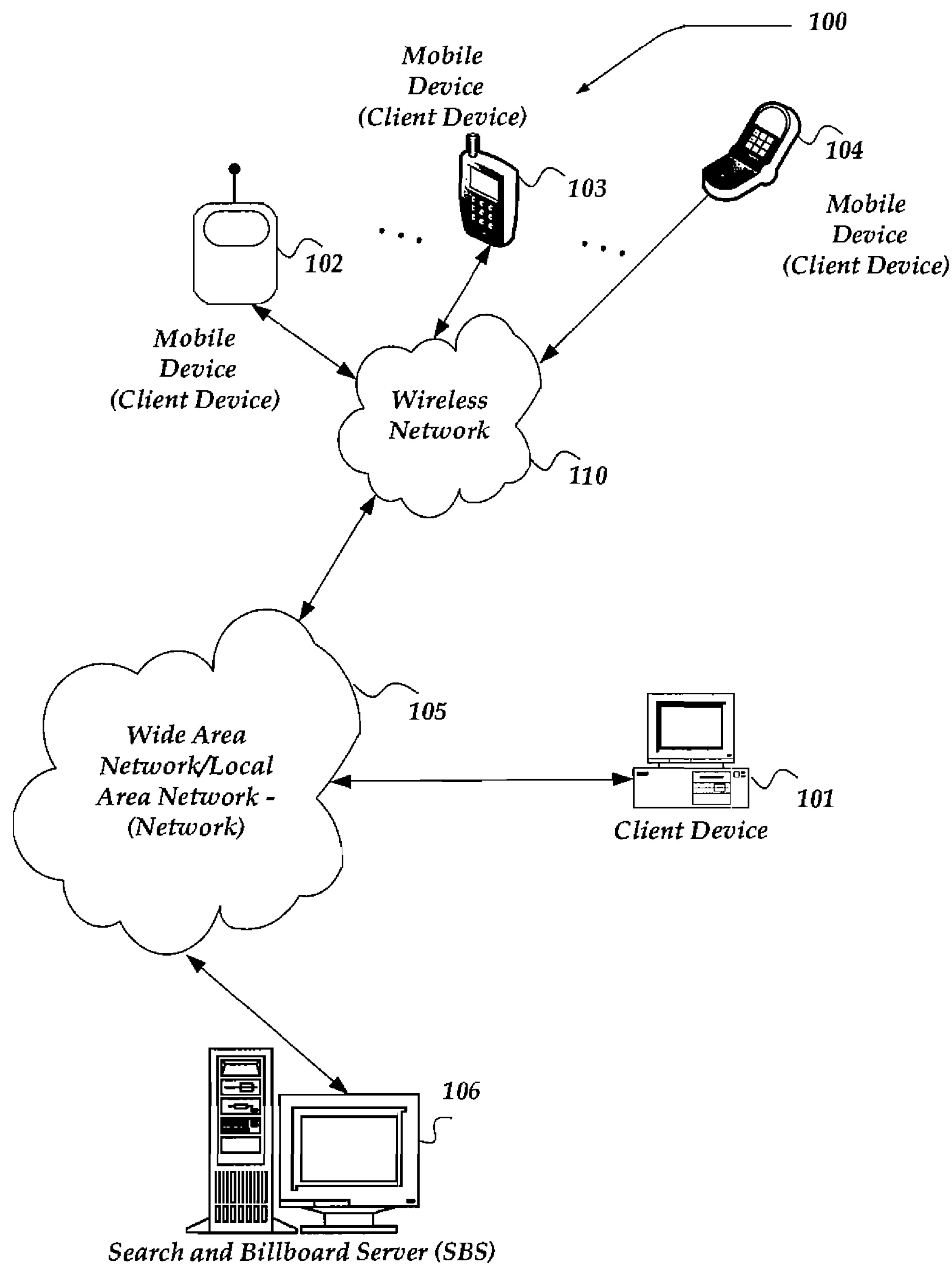
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase “in one embodiment” as used herein does not necessarily refer to the same embodiment, though it may. Furthermore, the phrase “in another embodiment” as used herein does not necessarily refer to a different embodiment, although it may. Thus, as described below, various embodiments of the invention may be readily combined, without departing from the scope or spirit of the invention.

In addition, as used herein, the term “or” is an inclusive “or” operator, and is equivalent to the term “and/or,” unless the context clearly dictates otherwise. The term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.” As used herein, the terms “device input” or “user input” refer to a user input command at a device.

As used herein, the term “geo-location” refers to any value based on a geographical coordinate system provided by a lookup mechanism, triangulation mechanism, or by any other location identification system, including GPS. The geo-location may identify a point in geographical two or three-dimensional space, or an area in geographical two or three-dimensional space. Lookup mechanisms include IP address to geo-location mappings, MAC address to geo-location mappings, zip code lookup, or the like. Triangulation mechanisms include WiFi triangulation, General Packet Radio Services (GPRS), or any other cell phone data technology triangulation, or any other wireless and/or radio triangulation.

As used herein, the terms “within a proximity to” or “in proximity with” refer to two locations being near each other, wherein a measure of nearness may be a relatively small distance based on the scale of the measurement. Thus, for a large scale such as for distances between cities, the measure of nearness may be larger, but for a street level or the like, the measure may be smaller. The measure of nearness may be determined by any geometric measure, including a direct line between the locations, a Manhattan distance between the locations, or even determined by a user, or the like. In one embodiment, a geo-location may be within a proximity to another geo-location if the distance between the two locations is within a threshold distance. In one embodiment, the distance may be determined by a Euclidian distance equation. In another embodiment, other formulas may also be used to take into account the curvature of the Earth, such as the Haversine equation, or the like.

As used herein, the term “virtual billboard” refers to a textual, graphical, sound, or other multi-media advertisement. As used herein, the term “traffic” refers to a measure of activity associated with a geo-location. Traffic may refer to an amount of physical movement of persons, vehicles, or the like (i.e., “foot traffic”) across a geo-location and/or a point or area in proximity with the geo-location. The amount may be the number of persons, vehicles, or the like, a change in the number over time, or any other measure based on the number. Traffic may also refer to an amount of search results returned to a plurality of search users, wherein the search results are associated with the geo-location and/or a point or area in proximity with the geo-location. The traffic may be a number of impressions, a change in the number over time, or any other measure based on the number.

Briefly, the present invention is directed to providing advertising information to a mobile device over a network. A request is received from the mobile device. The request may comprise a query, geo-location information and/or a user preference. If the request comprises the query, a search result is generated based on a search for the received query and/or the received geo-location information. At least one virtual billboard is determined, wherein the at least one virtual billboard is in proximity with a first geo-location identified by the received geo-location information and/or a second geo-location associated with the search result. The virtual billboard may also be based on a type of the virtual billboard, a time, a user preference (criterion), and/or a keyword included in the query. The virtual billboard is provided to the mobile device. An advertising usage is recorded for the provided virtual billboard.

Illustrative Operation Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, Wireless network 110, Search and Billboard Server (SBS) 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, Wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as cellular telephones, smart phones, display pagers, radio frequency (Rb) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an MSISDN, an electronic serial number (ESN), or other mobile device identifier. In one embodiment, the MSISDN may comprise a Country Code (CC), National Destination Code (NDC) which may identify at least one or part of a public land mobile network (PLMN), and a Subscriber Number (SN). The information may also indicate a content format that the mobile device is enabled to employ. Such information may be provided in a message, or the like, sent to SBS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as SBS 106, client device 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device, such as SBS 106. Such end-user account, for example, may be configured to enable the end-user to receive emails, send/receive IM messages, SMS messages, access selected web pages, or the like.

In addition, mobile devices 102-104 may include another application that is configured to enable the mobile user to share and/or receive media content, and to display the media content. In one embodiment, each of mobile devices 102-104 may share with and/or receive the media content from SBS 106 and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

In conjunction with sharing media content, mobile devices 102-104 may enable an interaction with each other, through sharing various messages, and generally participating in a variety of integrated social experiences beyond merely voice communications. Moreover, mobile devices 102-104 may enable transceiving a message through an application interface on one of SBS 106, wherein SBS 106 further routes a version of the message to a mobile device associated with a destination phone number. Mobile devices 102-104 may also communicate with non-mobile client devices, such as client device 101, or the like. In one embodiment, such communications may include providing information about the shared media to a user of client device 101, or the like.

Client device 101 may include virtually any computing device capable of communicating over a network to send and receive information. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared media content, and to annotate the media content, add additional media content, or the like.

In one embodiment, client devices 101-104 is configured to send a request to SBS 106 over network 105 and/or wireless network 110. In one embodiment, the request may include a query and/or geo-location information. Based on the request, SBS 106 may provide a virtual billboard over network 105 and/or wireless network 110. SBS 106 may also provide a plurality of search results based on the request.

In one embodiment, as client devices 101-104 move physically closer to a geo-location, client devices 101-104 may automatically send geo-location information to SBS 106. SBS 106 may respond with a virtual billboard for the geo-location and/or search results. In another embodiment, a user of client devices 101-104 may enter a search query. The search query may be sent to SBS 106. Geo-location information, such as GPS data, may be sent with the search query to SBS 106. SBS 106 may provide a virtual billboard based on the received search query and/or geo-location information. In any case, the virtual billboard may be displayed on client devices 101-104 on a display, on a map, a popup, or the like.

In one embodiment, one of client devices 101-104 may be in proximity with a geo-location. In one embodiment, one of client devices 101-104 may automatically send GPS data generated by one of client devices 101-104 to SBS 106 over wireless network 110 and/or network 105. In another embodiment, a user of one of client devices 101-104 may enter a search query. The search query and the generated GPS data may be sent to SBS 106. A virtual billboard associated with the geo-location and/or another geo-location associated with search results for the search query may be received from SBS 106. In one embodiment, a plurality of virtual billboards may be received.

In one embodiment, the virtual billboard may be personalized and/or determined based on a non-geographic criterion, including a user preference. In one embodiment, one of client devices 101-104 may enable a user to enter a non-geographic criterion, such as an interest in sports. The non-geographic criteria may be sent to SBS 106 over wireless network 110 and/or network 105. In another embodiment, the non-geographic criteria may be gathered by third-party server(s), by usage tracking (e.g., search tracking, tracking of web surfing patterns) for the user and/or one of client devices 101-104. In any case, in addition to being based on received geo-location information and/or a search query, a virtual billboard may be determined based on the non-geographic criteria.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of Wireless network 110 may change rapidly. In one embodiment, at least a portion of Wireless network 110 comprises a Public Land Mobile Network (PLMN), a Public Telephone Switching Network (PTSN), Gateway Mobile Switching Centers (GMSCs), or the like.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, Wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, Wireless network 110 may include virtually any wireless communication mechanism by which information may travel between mobile devices 102-104 and another computing device, network, and the like. As shown wireless network 110 provides a communication mechanism for mobile device 102-103, and wireless network 110 provides a communication mechanism for mobile device 104.

Network 105 is configured to couple SBS 106 and its components with other computing devices, including, mobile devices 102-104, client device 101, third party lookup server 110, and through Wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Furthermore, remote computers and other related electronic devices could be remotely connected to either LANs or WANs via a modem and temporary telephone link. In one embodiment, network 105 may be configured to transport information over an Internet Protocol (IP). In essence, network 105 includes any communication method by which information may travel between SBS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair or coaxial cable, fiber optics, wave guides, and other wired media and wireless media such as acoustic, RF, infrared, and other wireless media.

One embodiment of SBS 106 is described in more detail below in conjunction with FIG. 3. Briefly, however, SBS 106 may include any computing device capable of connecting to Network 145 to manage and/or provide virtual billboards to client devices 101-104. In one embodiment, SBS 106 may be configured to manage a purchase of a right to use a virtual billboard by an advertiser and/or to receive payment from the advertiser for enabling storing, searching and providing of a virtual billboard associated with a geo-location.

In one embodiment, SBS 106 may track traffic associated with at least one geo-location. In one embodiment, SBS 106 may receive impression information associated with a geo-location from client devices 101-104 and/or a third-party server. In one embodiment, SBS 106 may receive foot traffic information associated with a geo-location from client devices 101-104 and/or a third-party server. In one embodiment, the foot traffic information may be geographical information, including GPS data. For example, SBS 106 may receive GPS data for a plurality of mobile devices over time. SBS 106 may identify the geo-location of each one of client devices 101-104 via GPS coordinates sent from client devices 101-104, IP addresses, MAC addresses, or the like of client devices 101-104, or even a user entered geo-location. SBS 106 may calculate the change of foot traffic over time for each of the at least one geo-location. In one embodiment, SBS 106 may calculate a price for a virtual billboard associated with at least one of the go-locations based on the traffic.

In one embodiment, SBS 106 may receive a request from at least one of client devices 101-104. The request may comprise a query and/or geo-location information, such as a GPS coordinate of a geo-location of one of client devices 101-104. In one embodiment, a search result may be generated based on a search for the request. At least one virtual billboard may be determined, wherein the at least one virtual billboard is in proximity with a first geo-location identified by the received geo-location information and/or a second geo-location associated with the search result. The virtual billboard may be provided to at least one of client devices 101-104 over network 105 and/or Wireless network 110. In one embodiment, SBS 106 may record an advertising usage for the provided virtual billboard.

Although FIG. 1 illustrates each of SBS 106 as a single computing device, the invention is not so limited. For example, one or more functions of each of SBS 106 may be distributed across one or more distinct computing devices. For example, tracking of traffic, providing purchasing of virtual billboard space, providing search services, sharing of media content, managing Instant Messaging (IM) sessions, SMS messages, email messages, transceiving of media content, may be performed by a plurality of computing devices, without departing from the scope or spirit of the present invention.

Illustrative Mobile Device

Figure 2:
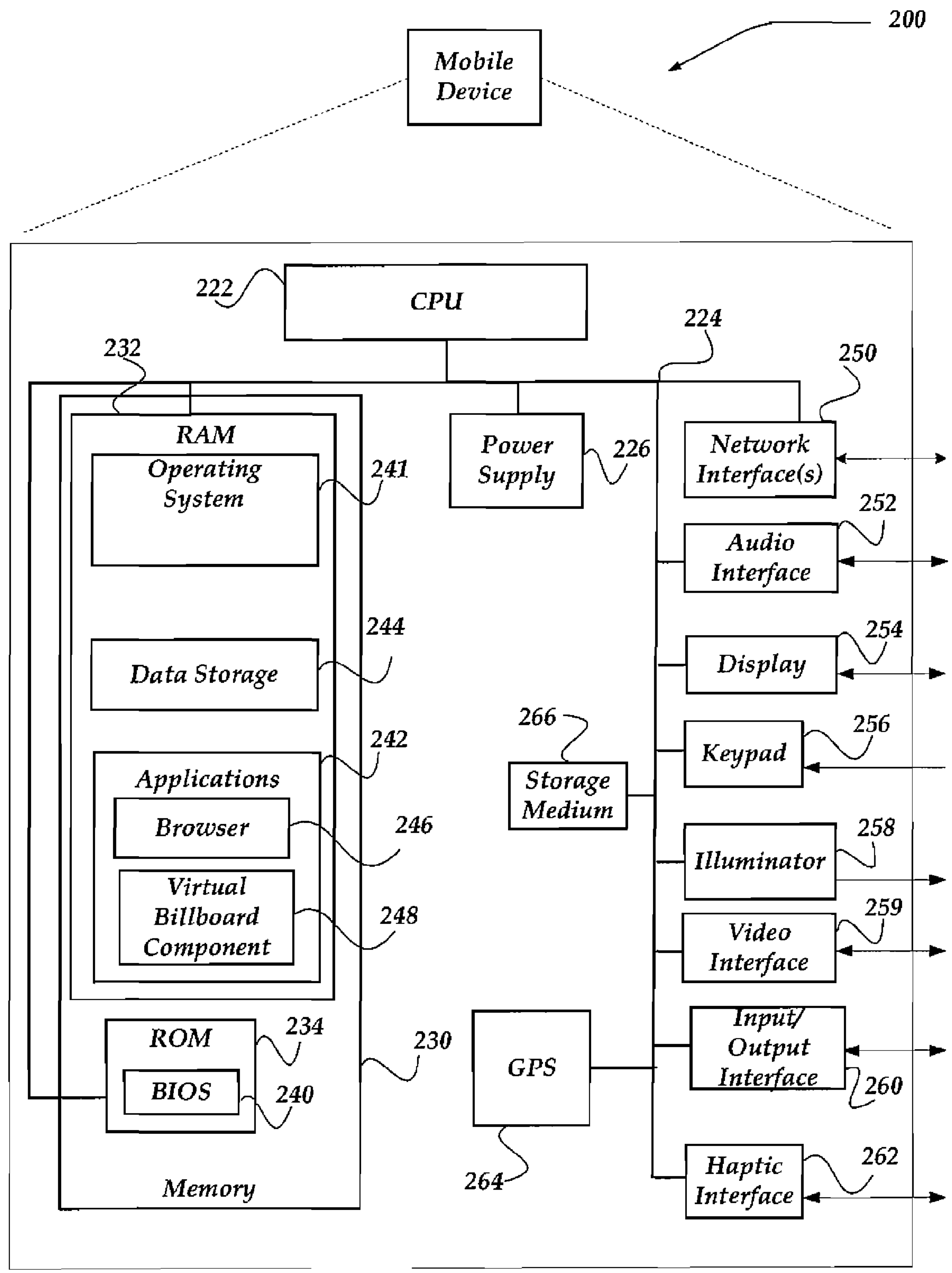
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a central processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning system (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted UPS (AGPS), E-OTD, CI, SAI, ETA, BSS or the like, to further determine the physical location of mobile device 200 on the surface of the Earth. It is understood that under different conditions, UPS transceiver 264 can determine a physical location within millimeters for mobile device 200; and in other cases, the determined physical location may be less precise, such as within a meter or significantly greater distances. In one embodiment, however, mobile device 200 may, through other components, provide other information that may be employed to determine a physical location of the device, including, for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with, a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member lists, or the like. At least a portion of the media content may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SGML), such as HyperText Markup Language (HTML), a wireless application protocol (WAP), a Handheld Device Markup Language (HDML), such as Wireless Markup Language (WML), WMLScript, JavaScript, and the like. Browser 246 may also be configured to receive, store, and/or provide data. For example, in one embodiment, browser 246 may receive and store client device data in the form of a cookie, or the like.

Virtual billboard component (VBC) 248 includes any component configured to manage searching and/or receiving virtual billboards. In one embodiment, VBC 248 may be a component of browser 246 (e.g., a JavaScript, plug-in, or the like). In another embodiment, VBC 248 may a separate process or program in communication with browser 246. In one embodiment, VBC 248 may automatically and/or periodically retrieve GPS data (coordinate) from GPS transceiver 264. VBC 248 may send the GPS data over network interface(s) 250 to a Search and Billboard Server (SBS). VBC 248 may also manage sending a search query over network interface(s) 250. In one embodiment, VBC 248 may use browser 246 to send the search query. In one embodiment, browser 246 may send the GPS data with the search query (e.g., in a hidden field of a web page, as part of the URL, HTTP header information, as an XML-RPC, web service, or the like). VBC 248 may receive a virtual billboard over network interface(s) 250. In one embodiment, VBC 248 may also receive a plurality of search results. The search results may be a web page, a list of URLs, or the like. In on embodiment, at least one of the search results may be indicated as the virtual billboard. In one embodiment, VBC 248 may receive an alert in the form of the virtual billboard (e.g., through a push of the virtual billboard over network interface(s) 250 or a pull of the virtual billboard based on a polling).

In one embodiment, VBC 248 may provide the virtual billboard on display 254, as a pop-up, an item (image, text, overlay) on a map, or the like. In one embodiment, VBC 248 may display the virtual billboard on browser 246. In one embodiment, VBC 248 may provide the virtual billboard over audio-interface 252 as a sound, video-interface 259, display 254, haptic interface 262, or the like.

In one embodiment, VBC 248 may also provide a mechanism for entering a user preference. VBC 248 may provide a web page for entering the user preference or other entry screen, though for example, browser 246. The user preference may be entered on input/output interface 260. In one embodiment, a user preference may be based on a usage of mobile device 200. In any case, VBC 248 may send the user preference(s) over network interface(s) 250 to an SBS for determining a virtual billboard to provide to mobile device 200.

Illustrative Network Device

Figure 3:
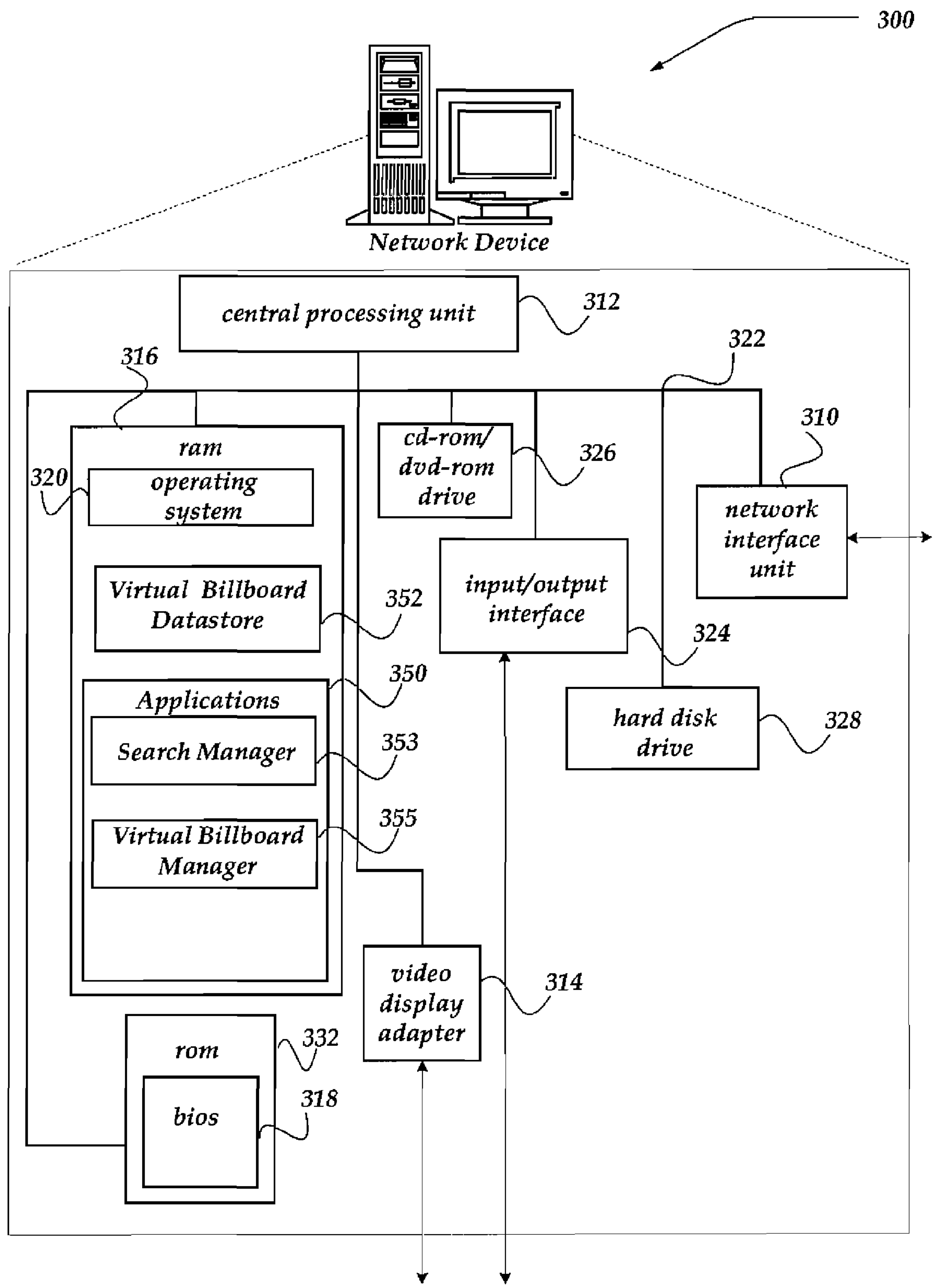
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, SBS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD)

or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs (including XmlHTTPRequest (XHR), Asynchronous JavaScript and XML (AJAX), or JavaScript Object Notation (JSON) programs), customizable user interface programs, IPSec applications, encryption programs, security programs, account management, and so forth.

Virtual billboard datastore (VBD) 352 includes any component for storing at least one virtual billboard. The virtual billboard may be stored in RAM 316, hard disk drive 328, or the like. The virtual billboard may be stored in a database, or the like. A data structure of the virtual billboard may include a geo-location associated with the virtual billboard, a type, a right by an advertiser to use the virtual billboard (e.g., a time range, usage constraint, or the like), at least one identify of one advertiser associated with the virtual billboard, and content for the virtual billboard (e.g., text, image, sound, or other multimedia).

Search manager 353 includes any component for performing a search based on a search query. Search manager 353 may perform any variety of search techniques, including an inverse lookup search, use a latent semantic distance, clustering, information gain, or the like. The search query may comprise a plurality of keywords. Search manager 353 may perform an information retrieval search on a database or other knowledge base of documents, stored for example, on hard disk drive 328, RAM 316, or the like. Search manager 353 may perform the search based on geo-location information. For example, a document may be associated with a geo-location because it includes keywords associated with that geo-location (e.g., an address, a zip-code, or the like). The information retrieval search may weigh the search result based on a proximity between a geo-location identified by the geo-location information and a geo-location associated with the documents.

Virtual billboard manager (VBM) 355 includes any component for managing the purchase and provisioning of virtual billboards. VBM 355 may receive traffic information associated with at least one geo-location. VBM 355 may store the association in VBD 352. VBM 355 may compute the traffic measure or the like for the at least one geo-location. VBM 355 may provide a mechanism for purchasing a right to provide advertisement using the virtual billboard. In one embodiment, VBM 355 may provide a web page, web service, or the like over network interface 310. VBM 355 may receive a payment, a bid, a reverse-bid, or the like, for the right to use the virtual billboard over network interface 310. VBM 355 may receive an advertisement to be used with the virtual billboard over network interface 310. In one embodiment, based on receive geo-location information and/or search results provided by search manager 353, VBM 355 may determine that the virtual billboard is to be provided for the geo-location. VBM 355 may filter out other virtual billboards that does not meet at least one other non-geographic criteria, such as time, type, user preference(s), or the like. VBM 355 may select the virtual billboard to be provided based on the other non-geographic criteria. The virtual billboard may be provided over network 310. An advertising usage or other charge related information may be recorded in virtual billboard datastore 352 based on the providing of the virtual billboard.

Generalized Operation

Figure 4:
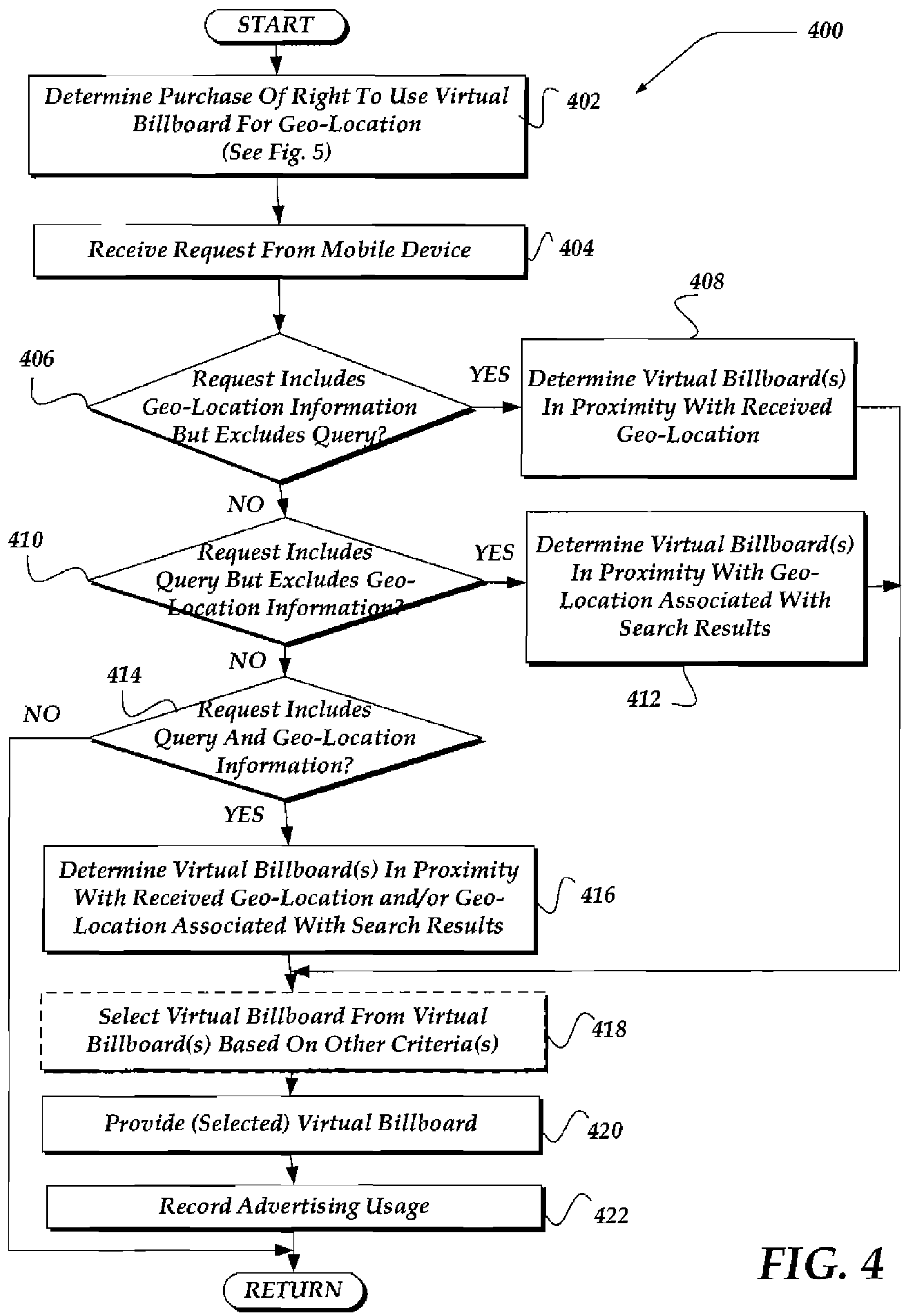
FIG. 4 illustrates a logical flow diagram generally showing one embodiment of a process for providing advertising information on a mobile device.
Figure 5:
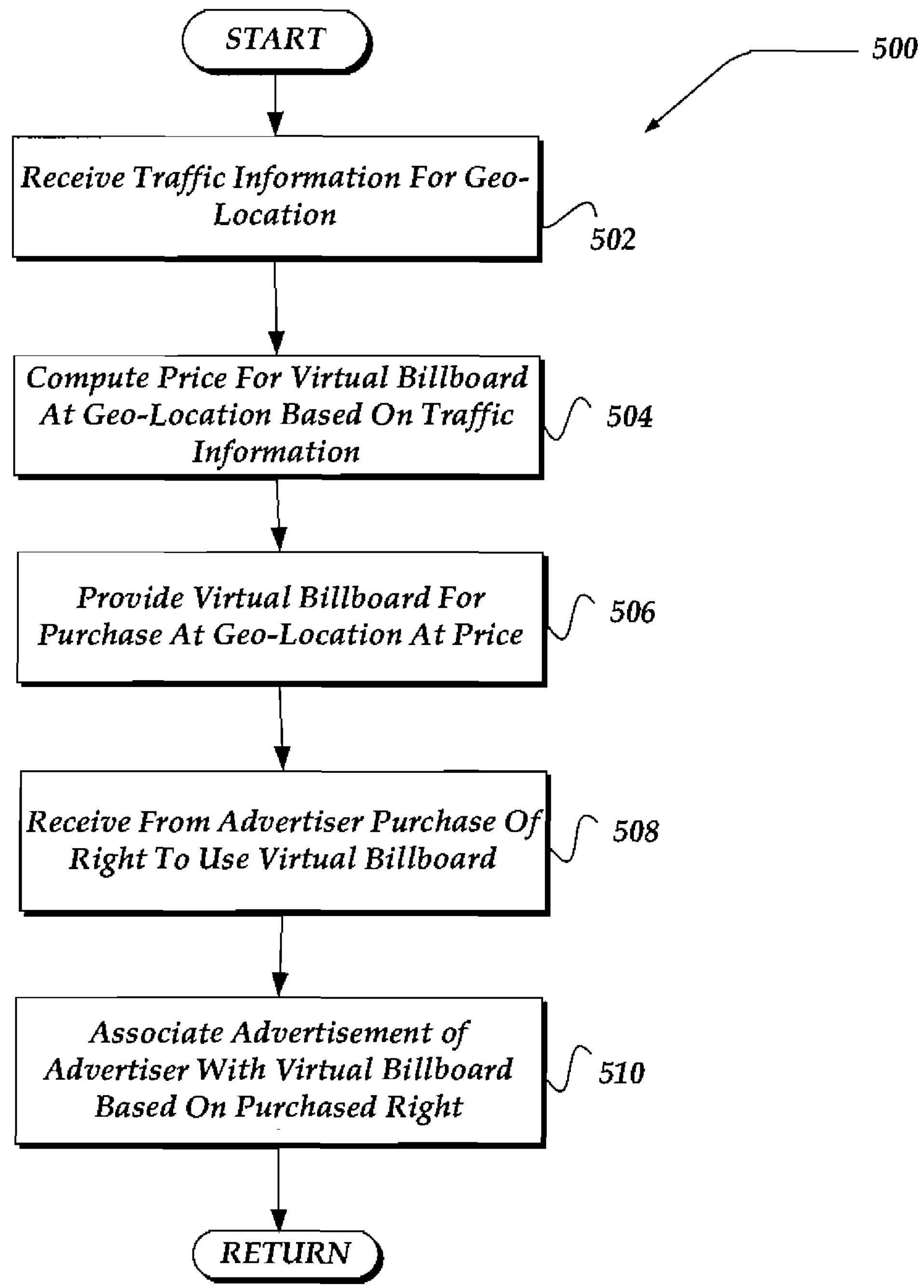
FIG. 5 illustrates a logical flow diagram generally showing one embodiment of a process for managing a purchase of a virtual billboard, in accordance with the present invention.

The operation of certain aspects of the invention will now be described with respect to FIGS. 4-5. FIGS. 4-5 provide logical flow diagrams of certain aspects of the present invention. The processes of FIGS. 4-5 may be implemented, for example, within client devices 101-104 and/or SBS 106 of FIG. 1.

FIG. 4 illustrates a logical flow diagram generally showing one embodiment of a process for providing advertising information on a mobile device. Process 400 begins at block 402, where a purchase of a right to use a virtual billboard for a geo-location is determined. The process of block 402 is described in more detail in conjunction with process 500 of FIG. 5. Processing then continues to block 404.

At block 404, a request is received from a mobile device. The request may be received over a network. The request may comprise a search query, geo-location information, or the like. The search query may comprise at least one key word, a Boolean operator, or the like. Processing then continues to decision block 406.

At decision block 406, it is determined if the request includes the geo-location information and excludes the query (e.g., does not include the query). If it is determined if the request includes the geo-location information and excludes the query, processing continues to block 408. Otherwise, processing continues to decision block 410.

At block 408, at least one virtual billboard is determined. In one embodiment, the at least one virtual billboard may be determined based on whether the virtual billboard is in proximity with the geo-location identified by the received geo-location information. In one embodiment, the search result may be generated based on the geo-location information. The at least one virtual billboard may be determined based on whether the virtual billboard is in proximity with the geo-location identified by the received geo-location information or the geo-location associated with the search result. In one embodiment, the at least one virtual billboard may be determined to be at an equidistance between the two geo-locations, biased to one geo-location, or the other, based only on one geo-location, or the like. Processing then continues to block 418.

At decision block 410, it is determined if the request includes the query and excludes geo-location information. If the request includes the query and excludes geo-location information, processing continues to block 412. Otherwise, processing continues to decision block 414.

At block 412, the virtual billboard is determined based on whether the virtual billboard is in proximity with a geo-location associated with the search result. In one embodiment, the associated geo-location may be based on a parse of the search result for a location (e.g., address, zip-code, or the like), based on meta-data associated with the search result, or the like. In one embodiment, the search result may be generated based on the query. The generation may be based on any search engine technology. Processing then continues to block 418.

At decision block 414, it is determined if the request includes the query and includes the geo-location information. If the request includes the query and includes the geo-location information, processing continues to block 416. Otherwise, processing returns to a calling process for further processing.

At block 416, the at least one virtual billboard is determined based on whether the virtual billboard is in proximity with the geo-location identified by the received geo-location information or the geo-location associated with the search result. In one embodiment, the at least one virtual billboard may be determined to be at an equidistance between the two geo-locations, biased to one geo-location, or the other, based only on one geo-location, or the like. In one embodiment, the search result may be generated based on the query. Processing then continues to block 418.

At block 418, a virtual billboard is selected from the at least one virtual billboard based on a non-geographic criterion. In one embodiment, the non-geographic criteria may include a user preference, a type of the at least one virtual billboard, a time, a keyword included in the query, or the like. In one embodiment, the non-geographic criterion may be received with the request, or in a separate communication than the request. In one embodiment, a keyword may be associated with a type of the virtual billboard and/or a content of an advertisement provided with the virtual billboard (e.g., the keyword "football" may be associated with sports type billboards). Based on the non-geographic criteria, the virtual billboard may be selected and/or other virtual billboards may be filtered out from the selection.

For example, at least two possible virtual billboards may be determined based on the received geo-location information and/or search query. One of the virtual billboards may be about sports equipment, while another virtual billboard may be about cars. Because the user is interested in sports based on the user preference (non-geographic criteria), the virtual billboard for sports equipment may be provided and/or ordered or otherwise prioritized higher than other provided virtual billboards.

In one embodiment, web surfing and/or querying may be tracked, and a set of keywords may be determined based on the surfing and/or tracking. For example, a user may visit a sports related website often. Thus, it would be determined that the user preference and/or keyword associated with the user (non-geographic criteria) may include a determined keyword, e.g., "sport."

In another embodiment, a schedule, or other constraint may be used to select a virtual billboard to be provided, for example, at a certain time. In one embodiment, block 418 may be optional and may not be performed. Processing then continues to block 420.

At block 420, at least one of the virtual billboard (e.g., the selected virtual billboard) is provided. In one embodiment, the virtual billboard may be one of a plurality of search results sent to a client device. In another embodiment, the virtual billboard may be separate from the plurality of search results. The sent plurality of virtual billboards may be ordered. The plurality of virtual billboards may be displayed in series, all at once, as a slide-show, or the like on a client device. Processing then continues to block 422.

At block 422, an advertising usage for the providing of the virtual billboard is recorded. The advertising usage may be a charge, a bill, a debit of an account, or the like. In one embodiment, the advertising usage may be based on the price, a pre-set amount, an amount based on time of day, traffic, or the like. An account of an advertiser may be debited, or otherwise modified to identify the advertising usage. Processing then returns to a calling process for further processing.

FIG. 5 illustrates a logical flow diagram generally showing one embodiment of a process for managing a purchase of a virtual billboard. Process 500 begins at block 502, where traffic information for a geo-location is received. In on embodiment, the traffic information is received over a network. Processing then continues to block 504.

At block 504, a price for the virtual billboard is generated based on the received traffic information. In one embodiment, the price for the virtual billboard at the geo-location may be based on a linear function of the traffic, a non-linear function, or the like. In one embodiment, the price may increase with an increase in the traffic.

In one embodiment, there may be different types of virtual billboards. The prices for different types of virtual billboards may be different based on demand (e.g., bidding), or the like. In one embodiment, the price for a virtual billboard may be a one time charge, a charge per impression, a charge based on an amount of traffic associated with the geo-location when the virtual billboard is provided. Processing then continues to block 506.

At block 506, the at least one virtual billboard is provided for purchase based on the price. Purchasing may comprise bidding, reverse bidding, or any other form of purchasing of a right to display advertising information on the virtual billboard or otherwise use the virtual billboard. In one embodiment, the purchased right for the virtual billboard may be time limited, such as a lease of the virtual billboard for a certain time, within a certain time window (e.g., every morning at 9:00 AM-10:00 AM, Christmas 2007), or the like.

In one embodiment, purchase may be provided through a web page, or the like using HTTP, or another protocol. In one embodiment, a plurality of different types of virtual billboards may be available for a geo-location. Each type may be for a different type of ads, based on sponsored/purchased keywords, or the like. For example, a virtual billboard selling a car and a virtual billboard selling a sports equipment may be available for the same geo-location. Purchasing may be available for the different types of virtual billboards. The types may comprise a plurality of advertising categories, including consumer goods, automotive, luxury goods, electronics, services, or the like. Processing then continues to block 508.

At block 508, a purchase of a right to use the virtual billboard is received. The purchase may be received as an online transaction, a payment using a credit card (e.g., through a credit card vendor), or the like. An account of the purchaser (e.g., advertiser) may be modified, credited, or the like, to show the purchase. Processing then continues to block 510.

At block 510, an advertisement (e.g., received from the advertiser) may be associated with the purchased virtual billboard based on the purchased right. The advertisement may be text, a sound, an image, or other multimedia. The advertisement may be included within, or otherwise associated with the virtual billboard. The advertisement may be modified to fit with the virtual billboard (e.g., scaled, color-coordinated, or the like). Processing then returns to a calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method comprising:

receiving, at a computing device, a request from a mobile device over a network;

determining, via the computing device, whether the request includes one or more of a search query and geo-location information;

when it is determined that the request includes the search query and excludes the geo-location information:

generating a search result based on the search query;

parsing the search results to determine a first geo-location; and determining the at least one virtual billboard in proximity with the first geo-location derived from the search result; and communicating the at least one virtual billboard to the mobile device; and when it is determined that the request includes the geo-location information identifying a second geo-location and excludes the search query:

determining at least one further virtual billboard in proximity with the second geo-location identified by the geo-location information; and communicating the at least one further virtual billboard to the mobile device.

2. The method of claim 1, wherein the geo-location information comprises global positioning system data.

3. The method of claim 1, further comprising:

when it is determined that the request includes the geo-location information identifying the second geo-location and includes the search query:

generating a further search result based on the query and the received geo-location information identifying the second geo-location;

parsing the further search results to determine a third geo-location;

determining one or more virtual billboards in proximity with one or more of the second geo-location or the third geo-location; and providing the one or more virtual billboards to the mobile device.

4. The method of claim 1, further comprising:

recording an advertising usage for the provided at least one virtual billboard.

5. The method of claim 1, further comprising:

receiving traffic information for the first geo-location;

generating a price for the at least one virtual billboard based on the received traffic information;

providing the at least one virtual billboard for purchase based on the price; and receiving a purchase of a right to associate an advertisement with the at least one virtual billboard, before providing the at least one virtual billboard to the mobile device.

6. The method of claim 1, further comprising ordering the at least one virtual billboard based on a proximity between each location of each of the at least one virtual billboard and the geo-location information.

7. The method of claim 1, further comprising:

selecting the at least one virtual billboard based on a preference of a user associated with the mobile device.

8. An apparatus, comprising:

a processor;

a non-transitory storage medium for tangibly storing thereon program logic for execution by the processor, the program logic comprising:

receiving logic executed by the processor for receiving a request from a mobile device over a network;

determining logic executed by the processor for determining whether the request includes one or more of a search query and geo-location information;

when it is determined that the request includes the search query and excludes the geo-location information:

generating logic executed by the processor for generating a search result based on the search query;

parsing logic executed by the processor for parsing the search results to determine a first geo-location;

further determining logic executed by the processor for determining the at least one virtual billboard in proximity with the first geo-location derived from the search result; and communication logic executed by the processor for communicating the at least one virtual billboard to the mobile device; and when it is determined that the request includes the geo-location information identifying a second geo-location and excludes the search query:

determining logic executed by the processor for determining at least one further virtual billboard in proximity with the second geo-location identified by the geo-location information; and communication logic executed by the processor for communicating the at least one further virtual billboard to the mobile device.

9. The apparatus of claim 8, wherein the geo-location information comprises a geolocation point based on a global positioning system data, or a geo-location area based on the global positioning system data.

10. The apparatus of claim 8, wherein the program logic further comprises:

providing an auction for the at least one virtual billboard before providing the at least one virtual billboard.

11. The apparatus of claim 8, wherein the program logic further comprises:

further determining logic executed by the processor for determining a price for the advertising usage, wherein the price is based on a plurality of global positioning system data associated with a plurality of mobile devices in proximity with another geo-location associated with the at least one virtual billboard, or based on an amount of historical query results associated with the other geo-location; and receiving a payment for the advertising usage based on the price.

12. The apparatus of claim 8, wherein the program logic further comprises:

selecting logic executed by the processor for selecting, before providing, the at least one virtual billboard from a plurality of virtual billboards based on a user preference criterion, wherein the plurality of virtual billboards is determined by the received request.

13. The apparatus of claim 8, wherein the program logic further comprising:

when it is determined that the request includes the geo-location information identifying a second geo-location and excludes the search query:

further determining logic executed by the processor for determining the at least one further virtual billboard in proximity with the second geo-location identified by the geo-location information; and further providing logic executed by the processor for providing the at least one further virtual billboard to the mobile device.

14. The apparatus of claim 8, wherein the program logic further comprising:

when it is determined that the request includes the geo-location information identifying a second geo-location and includes the search query:

another generating logic executed by the processor for generating a further search result based on the query and the received geo-location information identifying the second geo-location;

another parsing logic executed by the processor for parsing the further search result to determine a third geo-location;

another determining logic executed by the processor for determining one or more virtual billboards in proximity with one or more of the second geo-location or the third geo-location; and another providing logic executed by the processor for providing the one or more virtual billboards to the mobile device.

15. A non-transitory computer readable storage medium tangibly storing computer program instructions capable of being executed by a computer processor, the computer program instructions defining code for:

receiving a request from a mobile device over a network;

determinign whether the request includes one or more of a search query and geo-location information;

when it is determined that the request includes the search query and excludes the geo-location information:

generating a search result based on the search query;

parsing the search results to determine a first geo-location; and determining the at least one virtual billboard in proximity with the first geo-location derived from the search result; and communicating the at least one virtual billboard to the mobile device;

when it is determined that the request includes the geo-location information identifying a second geo-location and excludes the search query:

determining the at least one further virtual billboard in proximity with the second geo-location identified by the geo-location information; and communicating the at least one further virtual billboard to the mobile device; and when it is determined that the request includes the geo-location information identifying a second geo-location and includes the search query:

generating a further search result based on the query and the received geo-location information identifying the second geo-location;

parsing the further search results to determine a third geo-location;

determining one or more virtual billboards in proximity with one or more of the second geo-location or the third geo-location; and communicating the one or more virtual billboards to the mobile device.

16. The non-transitory computer readable storage medium of claim 15, wherein the computer program instructions further defining code for:

filtering the at least one virtual billboard, the at least one further virtual billboard or the one or more virtual billboards based on at least one of a user preference, a type of the at least one virtual billboard, a time, or a keyword included in the query.

17. A system comprising:

a processor;

a non-transitory storage medium for tangibly storing thereon program logic for execution by the processor, the program logic comprising:

receiving logic executed by the processor for receiving a request from a mobile device over a network;

determining logic executed by the processor for determining whether the request includes one or more of a search query and geo-location information;

when it is determined that the request includes the search query and excludes the geo-location information:

generating logic executed by the processor for generating a search result based on the search query;

parsing logic executed by the processor for parsing the search results to determine a first geo-location; and determining logic executed by the processor for determining the at least one virtual billboard in proximity with the first geo-location derived from the search result; and communicating logic executed by the processor for communicating the at least one virtual billboard to the mobile device;

when it is determined that the request includes the geo-location information identifying a second geo-location and excludes the search query:

determining logic executed by the processor for determining the at least one further virtual billboard in proximity with the second geo-location identified by the geo-location information; and communicating logic executed by the processor for communicating the at least one further virtual billboard to the mobile device; and when it is determined that the request includes the geo-location information identifying a second geo-location and includes the search query:

generating logic executed by the processor for generating a further search result based on the query and the received geo-location information identifying the second geo-location;

parsing logic executed by the processor for parsing the further search results to determine a third geo-location;

determining logic executed by the processor for determining one or more virtual billboards in proximity with one or more of the second geo-location or the third geo-location; and communicating logic executed by the processor for communicating the one or more virtual billboards to the mobile device.

18. The system of claim 17, further comprising:

filtering logic executed by the processor for filtering the at least one virtual billboard, the at least one further virtual billboard or the one or more virtual billboards based on at least one of a user preference, a type of the at least one virtual billboard, a time, or a keyword included in the query.

* * * * *